(No Model.)
J. J. WHITER.
COUPLING FOR BOILERS, TANKS, &c.
No. 377,506. Patented Feb. 7, 1888.
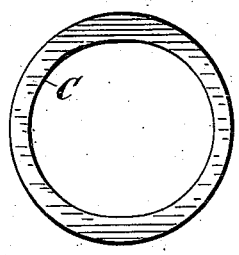
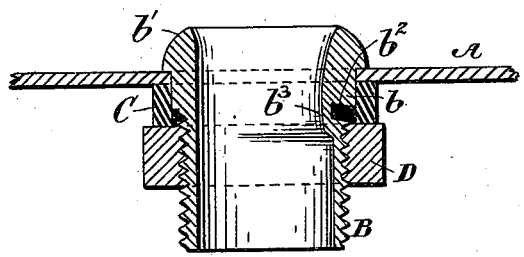
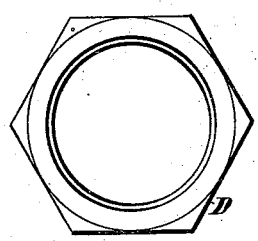
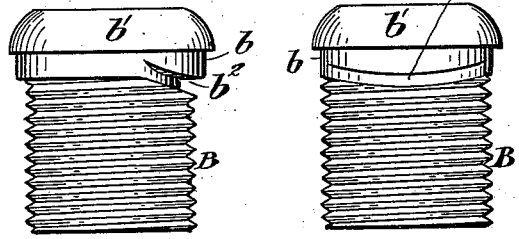
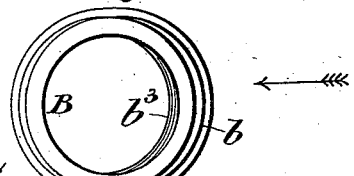
Witnesses
James D. Griswold
Maurice J. Roach
Inventor
James J. Whiter
by his attorney
Gifford Brown

UNITED STATES PATENT OFFICE.

JAMES J. WHITER, OF BROOKLYN, NEW YORK.

COUPLING FOR BOILERS, TANKS, &c.

SPECIFICATION forming part of Letters Patent No. 377,506, dated February 7, 1888.

Application filed May 26, 1887. Serial No. 239,385. (No model.)

*To all whom it may concern:*

Be it known that I, JAMES J. WHITER, of Brooklyn, in Kings county, and State of New York, have invented a certain new and useful Improvement in Couplings for Boilers, Tanks, &c., of which the following is a specification.

The object of my improvement is to provide a coupling for boilers, tanks, and like articles which shall be cheap to manufacture, simple in construction, and easy of application, and I particularly desire to provide a coupling which will have the advantages above specified and withal be capable of application from the outside of the boiler, tank, or like article.

I will describe a coupling embodying my improvement, and then point out its novel features in the claims.

In the accompanying drawings, Figure 1 is a section of part of a boiler—such, for instance, as is commonly used in houses in conjunction with a heater combined with a range—and this view also includes a longitudinal section of a coupling embodying my improvement. Fig. 2 is a sectional view of the said plate and a side view of the nipple partly introduced into the same. Fig. 3 is a side view of a nipple forming part of the coupling. Fig. 4 is a bottom view of this nipple. Fig. 5 is another side view, this latter view being taken as indicated by the arrow which is adjacent to Fig. 4. Fig. 6 is a bottom view of a washer or ring forming part of the coupling. Fig. 7 is a bottom of a nut forming part of the coupling.

Similar letters of reference designate corresponding parts in all the figures.

A designates the plate of the boiler. B designates the nipple. Throughout the greater portion of its length it is externally cylindrical, and is externally screw-threaded. It may also be internally cylindrical throughout the greater portion of its length. Near the upper end it is provided with a portion, $b$, adapted to interlock with the boiler through hole provided in the boiler-plate for its reception. This hole and the interlocking portion $b$ of the nipple B are in the present example of my improvement oval or elliptical; but I do not wish to be confined to adopting such shape for them. They should have such shape that the turning of the nipple within the hole will be prevented.

Above or beyond the interlocking portion $b$ of the nipple there is a flange, $b'$, extending from the nipple. This flange is intended to overlap the edge portion of the hole in the boiler-plate at the upper surface of the plate, so as to prevent the nipple from moving through the hole when a strain is exerted upon the nipple in the direction of its length.

It will be observed that the nipple is externally provided near the upper end with a notch, $b^2$. This notch $b^2$ is shown as extending obliquely to the axis or length of the nipple. In order that the formation of this notch $b^2$ shall not result in the material weakening of the nipple, I preferably provide the nipple internally with a projection, $b^3$, or, in other words, with an extra thickness opposite the notch.

To insert the nipple in the hole of the boiler-plate, the nipple will be canted so that that portion of its flange which is above the notch $b^2$ may be inserted through the hole in the plate, the nipple being so turned that the length of its elliptical or oval portion shall be at right angles to the length of the elliptical or oval hole. The nipple may be entered in this position, because its notch will enable the said portion of its flange which is adjacent to the notch to pass sufficiently over the edge of the hole in the plate to allow of the rear or diametrically-opposite portion of the flange to pass up through the hole. After the nipple has been thus far inserted the nipple will be pushed bodily upward, so that its longitudinal axis will be at right angles to the plate. Afterward it will be turned around, so as to bring the length of its oval or elliptical interlocking portion $b$ to coincide with the elliptical hole in the plate. Then the nipple may be pulled downwardly, so that its interlocking portion $b$ may occupy a position within the hole of the plate. The nipple will then be in the position which it is desired to occupy. After the nipple has been introduced into the hole of the plate, as just described, the washer or ring C will be slipped over it and passed up close to the exterior of the plate A. As this ring is internally elliptical, it can slip over the interlocking portion $b$ of the nipple. After the ring C has been arranged in place, as described, the nut D will be applied to the exterior of the nipple and turned upon the screw-thread thereof until it abuts against the lower edge of the ring.

By the application of sufficient power to the nut it may be made to clamp the ring or washer tightly against the under side of the plate A and to draw the flange $b'$ tightly down upon the inner surface of the said plate. Thus the tight joint may be made between the nipple and the plate.

If desirable, washers of packing material may be arranged between the ring and the boiler-plate, between the flange of the nipple and the boiler-plate, and between the nut and the said ring, to obviate any possibility of leakage.

The nipple at the lower or outer end may be extended and shaped as may be desired. As shown, it is adapted for the making of a screw-connection. It may, however, be so formed that a plumber may make an ordinary sweat-joint, or any other desired kind of joint.

It will be seen that my coupling consists of but few parts, is susceptible of being cheaply made, can be easily applied, and will be serviceable and durable when used.

Although I have only particularly described my improvement with relation to boilers, it is obviously applicable to tanks and a variety of other articles.

What I claim as my invention, and desire to secure by Letters Patent, is—

1. The combination, with a boiler or analogous article, of a nipple made in one integral piece and comprising a flange, a portion adjacent to the flange adapted to interlock with the boiler or other article through a hole therein, and provided with a notch adjacent to the flange, substantially as specified.

2. The combination, with a boiler or analogous article, of a nipple made in one integral piece and comprising a flange and a notch adjacent to the flange, and a nut engaging with said nipple, substantially as specified.

JAMES J. WHITER.

Witnesses:
 WM. H. H. SISUM,
 J. J. VAIL.